Patented June 14, 1938

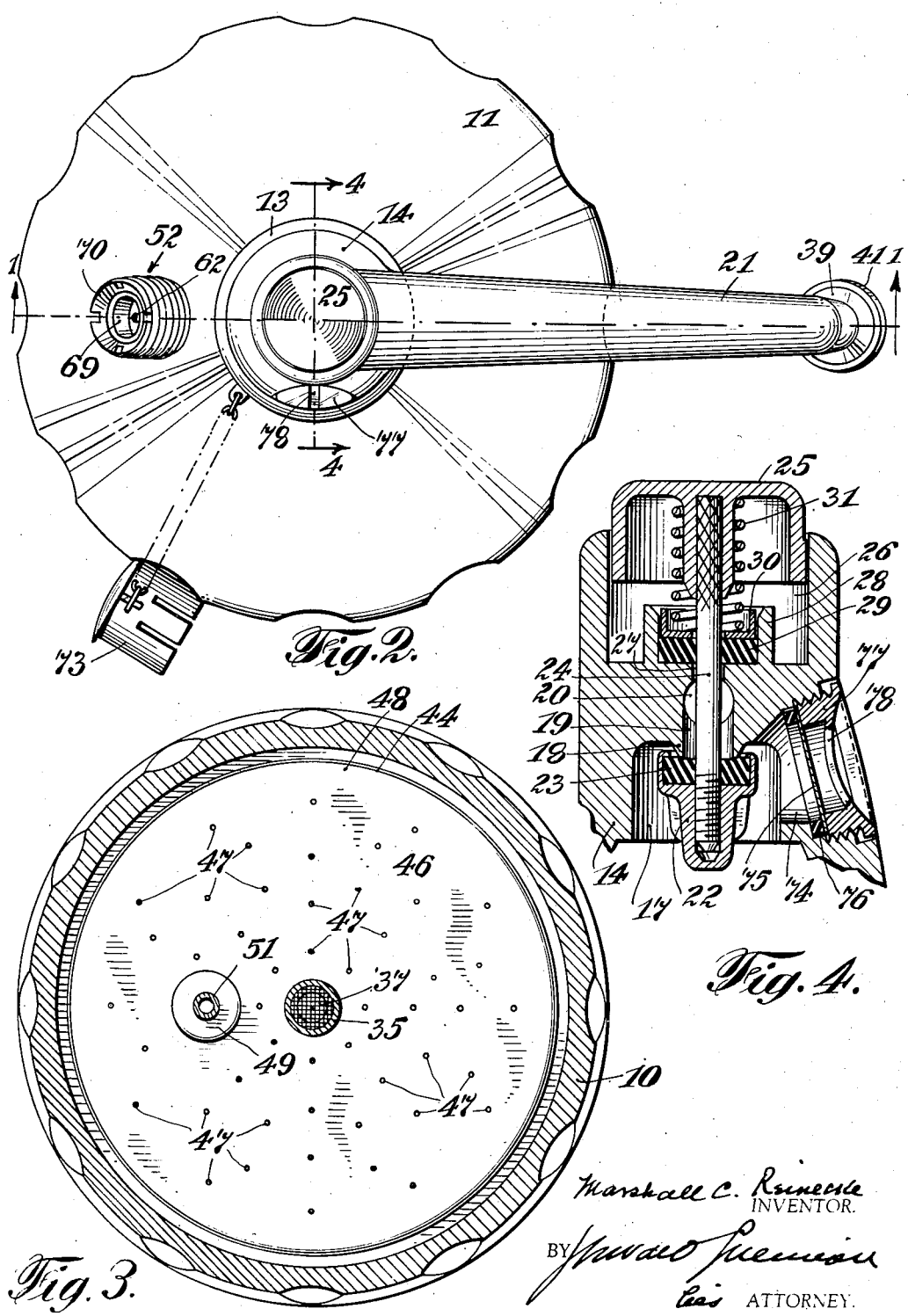

2,120,297

UNITED STATES PATENT OFFICE 2,120,297

DEVICE FOR PRODUCING AERATED EXPANDED FOOD PRODUCTS

Marshall C. Reinecke, Brooklyn, N. Y., assignor, by mesne assignments, to Food Devices Incorporated, New York, N. Y., a corporation of Delaware Application August 15, 1935, Serial No. 36,338

13 Claims. (Cl. 261—122)

My invention relates to the production of aerated expanded food products from materials capable of being thus treated and refers particularly to a process and device adapted to aerate and charge a liquid or semi-liquid flowable food material with a gas under pressure and then subsequently to produce at will an aerated expanded form or condition of any desired amount of such previously gas-charged material, while at the same time dispensing or discharging the expanded food product from the device, in a froth-like form.

Among the food products capable of being thus produced are the following:

Whipped cream, from creams of various butter-fat contents, and a similar whipped product from ordinary milk.

Ice cream and various ices.

Batters of all kinds, such as for cakes, wheat cakes, griddle cakes, and the like.

Custards of all kinds.

Cheeses, of the cottage cheese type.

I have discovered that many food products may be thus charged with a suitable gas under pressure and maintained in hermetic confinement in the gas-charged condition until desired for use. In effecting such charging, the gas under pressure is discharged into the lower portion of the material at a large plurality of extensively distributed points, the charging gas thus being disseminated throughout the material so as to produce a substantially homogeneously gas-charged body of material.

I have also discovered that the desired gas-expanded form of the food product can be attained by finely sub-dividing a flowing outgoing stream of the gas-charged material, such as by passing such stream through a suitable number of fine-mesh sieves in a dispensing conduit, whereby the larger bubbles of expanding gas are broken up into a larger number of smaller bubbles, which are capable of producing the desired result in the product.

My claimed invention will now be particularly described by reference to the accompanying drawings illustrating one form of device adapted for utilizing the invention and in which similar parts are designated by similar numerals.

Figure 2 is a plan view showing the top of the device.

Figure 3 is a horizontal section on the line 3—3 of Figure 1.

Figure 4 is an enlarged partial central vertical section on the vertical line 4—4 of Figure 2.

Figures 1, 5:
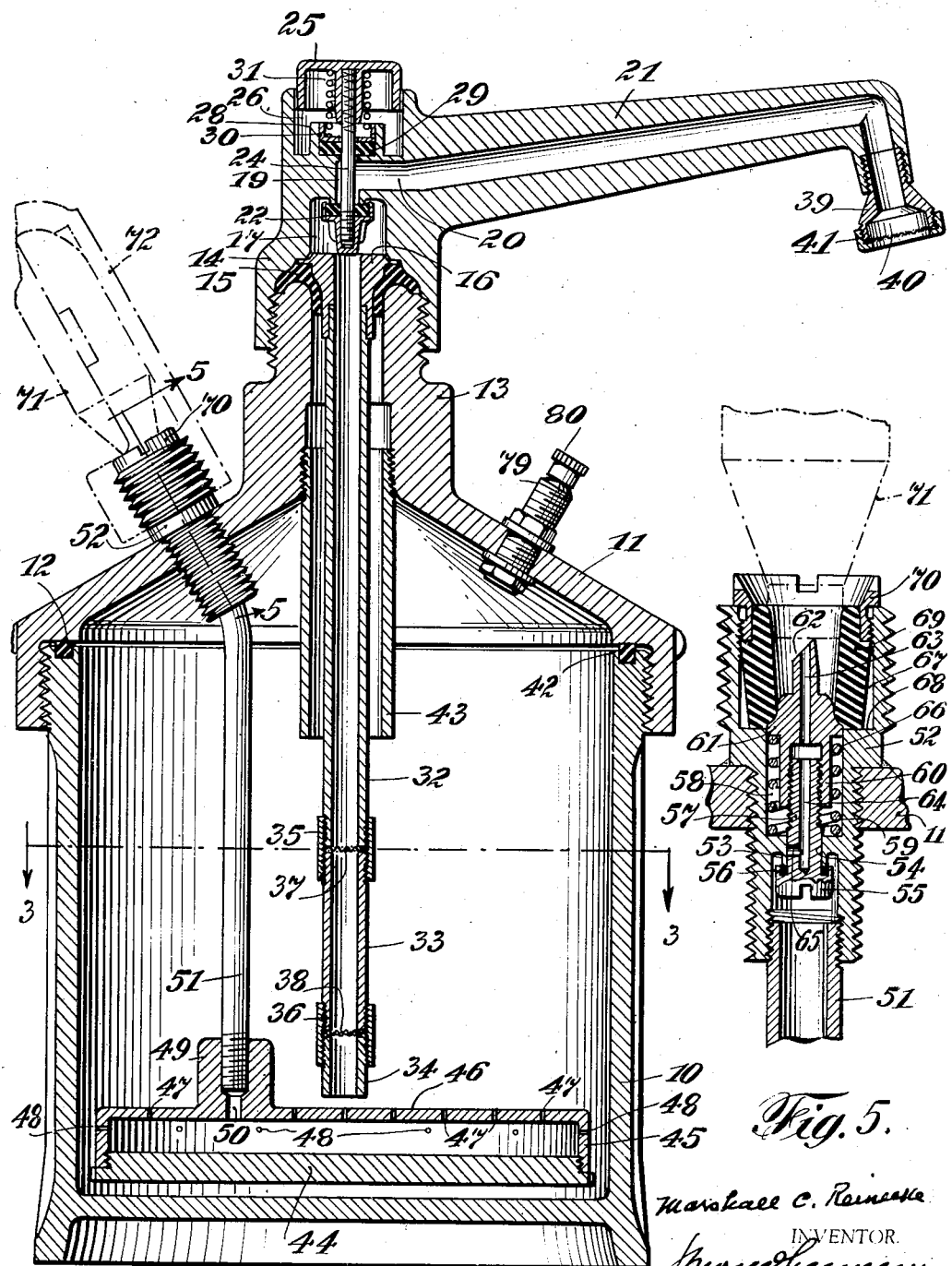
Figure 1 shows an embodiment of my invention in central vertical section on the horizontal line 1—1 of Figure 2.
Figure 5 is an enlarged broken section on the inclined line 5—5 of Figure 1.

In the form of my invention shown in the accompanying drawings a hermetically sealed container comprises a cylindrical jar 10 having a conical cover 11 removably screwed over its top, in abutment with an interposed annular gasket 12.

The top 11 has a tubular neck 13 over which a dispensing head 14 is removably screwed down upon a specially formed annular flanged gasket 15, the tubular opening of which is reduced in its lower portion. A removable sleeve 16, shaped to fit and extending through the gasket 15, has a peripheral flange by which it is pressed down by the head 14.

The dispensing head 14 forms a valve casing for a service valve which may be of any suitable construction, and is shown as being of a substantially usual form.

In the form of this valve shown in the drawings, the head 14 has therein a valve-head chamber 17 into which the sleeve 16 opens upwardly. The top of this chamber 17 has a downwardly extended annular valve seat 18 surrounding the lower end of a short vertical port 19, the upper end of which opens into a lateral port 20. An outwardly open laterally extended tube 21 forms a continuation of this port 20.

A valve head 22 carries a sealing disc 23 adapted to abut against the valve seat 18. The valve head 22 is shown as screwed over the lower end of an upwardly extended valve stem 24, the upper end of which is fixed in an outer operating button 25, which telescopes downwardly into a cavity 26 in the top of the head 14, this stem 24 passing through a hole 27 in the bottom of the cavity 26.

An annular flange 28 rises from the bottom of the cavity 26, and the valve stem 24 is slidable through a sealing washer 29 disposed upon the bottom of the cup formed by the flange 28. This sealing washer 29 is held in place by an overlying washer 30, shown as peripherally flanged upwardly.

This washer 30 forms an abutment for the lower end of a valve-closing coiled thrust spring 31 the upper end of which bears against the under side of the depressible valve-opening button 25, which is of inverted cup-shaped, with an inner boss surrounded by the spring 31 and from which boss the valve stem 24 extends.

The sleeve 16, dispensing head chamber 17, ports 19 and 20, and lateral tube 21, all form portions of a continuous dispensing conduit or duct leading from within the hermetically closed container chamber formed by the jar 10 and its cover 11.

The mentioned dispensing conduit further comprises a vertical tube shown as formed of three successively joined sections 32, 33, and 34. Thus upper section 32, which is the longest, has its upper end securely fixed in the lower end of the sleeve 16.

An internally screw-threaded coupling sleeve 35 connects together the externally screw-threaded opposed end of the upper and intermediate tube sections 32 and 33. A similar coupling sleeve 36 similarly connects together the intermediate tube section 33 and the lowermost and shortest tube section 34. This latter tube section 34 has an open lower end spaced above the bottom of the container jar 10 to a suitable extent for a particular purpose, as described later.

The upper coupling 35 draws the opposed ends of the tube sections 32 and 33 together upon and securely clamps in place an interposed sieve 37 which extends across the jointed tube 32, 33, 34 at this point. Another sieve 38, extending across this tube, is interposed between the opposed ends of its sections 33 and 34, and is similarly securely clamped in place by the lower coupling 36.

The outer end of the laterally extended tube 21 turns downwardly and terminates in a short tubular section 39 having an internally enlarged discharge end across which a sieve 40 extends and is securely clamped in place by a ring 41 having screw-threaded engagement with this terminal tube section 39.

The sieves 37, 38, and 40 are of fine woven wire screening. In the particular device illustrated, each of the two vertically spaced internal sieves 37 and 38 has a mesh of 100 to the square inch, while the mesh of the outer sieve 40 is 150 to the square inch.

The functioning of the mentioned sieves, which form an important element in my invention, will be described later.

The described hermetically closed container, comprising the jar 10 and its sealed cover 11, may be filled to a desired level with any desired suitable liquid or semi-liquid material simply by removing the dispensing head 14. Such material can then be poured into the jar 10 through the tube 32, 33, 34, or this tube may be removed if desired.

The normal filling level is indicated by a small internal annular rib 42 on the jar 10. Filling to overflowing or to an abnormal extent is prevented by a safety tube 43 having its upper end screwed into or otherwise hermetically fixed in the neck 13, surrounding and spaced from the upper tube section 32 and extending down to the level of the rib 42.

It is evident that this tube 43 will cause air to be trapped and compressed in the top portion of the container chamber. Of course the desired contents of the container can be measured out in advance, if desired. Also, if desired, air can be vented from the container chamber during filling, by means described later.

The hermetically confined contents of the container chamber are to be permeated by and charged with a suitable gas and the gas-charged material is then to be maintained under a suitable desired pressure of its contained gas and of the gas accumulated in the free space above the level of such material in the top portion of the container chamber.

The illustrated gas-charging means or element of my invention includes a hollow gas-receiving nozzle member disposed just above the bottom of the jar 10 and submerged in the bottom portion of the contained material, into which it is adapted to inject gas under pressure at a multiplicity of separate widely distributed points.

This gas-charging nozzle member is shown as made up of a flat circular bottom disc or plate 44 securely joined to a depending peripheral annular flange 45 of a downwardly flanged flat circular top disc or plate 46, with an enclosed gas space provided between these discs. The top disc 46 is provided with a large number of extensively scattered small apertures 47—47 through which jets of gas under pressure will escape. The flange 45 is shown as provided with similar apertures 48—48.

The bottom of the container jar 10 is shown as flat, and the bottom disc 44 is disposed in slightly spaced relation above this jar bottom, while the annular wall 45 is similarly slightly spaced inwardly from the vertical wall of the jar 10. The tube section 34 terminates a short distance above the nozzle top 46. It will be noted that the hollow gas-ejecting member 44, 45, 46 occupies and substantially fills the bottom portion of the jar 10.

The apertured plate 46 has thereupon a tubular boss 49, with a bore 50 extending through this plate, and into which there is screwed the lower end of a downwardly extended gas-supply feed tube 51. The upper end of this tube 51 is screwed into the inner end of a tubular nipple 52 which is screwed through the conical wall of the cover 11.

Thus the gas-discharge member 44, 45, 46 is supported by the gas-supply tube 51, by which it is suspended from the cover 11, by means of which it can be lifted out of the jar 10.

The nipple 52 has a shoulder-forming enlarged externally screw-threaded outer end portion projecting from the cover 11, which provides for the connection thereto of a source of gas under pressure.

The tubular nipple 52 forms a casing for a suitable inlet valve, that shown in the drawings being of a usual well known form, for similar usage.

Suitably spaced from its inner end, as well as from the upper end of the removably connected gas-feed tube 51, the nipple 52 has within it an annular valve seat 53 surrounding a port 54, adapted to be closed by an inwardly opening valve head 55 carrying a sealing ring 56 to abut against the valve seat 53. The valve head 55 is fixedly carried by an inner valve stem part 57 which extends through and beyond the short reduced port bore 54, into a larger bore part 58, forming an inner annular shoulder 59.

The inner valve stem part 57 screws into the inner end of a tubular outer stem part 60 which has a flange forming a head 61 at its outer end. A pointed piercing pin 62 projects outwardly from the head 61, which forms annular shoulders at both of its sides. The piercing pin 62 is tubular, having a small bore 63. The inner valve stem part 57 is also tubular, having a bore 64, which is intersected by a small cross bore 65 near the valve head 55.

The inner annular shoulder 59 of the nipple 52 forms an abutment for the inner end of a valve-closing coiled thrust spring 66, the outer end of which bears against the inner shoulder formed by the outer valve-stem head 61. It is evident that the valve head 55 can be unseated to an open position by means of inward pressure applied upon the outer side of the valve-stem head 61.

The enlarged outer end portion of the tubular nipple 52 has therein an outwardly opening large cylindrical recess or cavity 67, which forms an annular shoulder 68 with the outer end of the inner bore 58.

A soft rubber sealing annulus 69 within the cavity 67 is pressed upon the shoulder 68 by an outer retaining ring 70 which encircles an outer reduced shoulder-forming portion of the annulus 69 and which has a reduced shoulder-forming inner portion screwed into the outer end of the nipple cavity 67, beyond which this ring 70 extends and is internally flared beyond the end of the rubber annulus 69.

The source of compressed gas which I utilize in the carrying out of my invention in a practical manner, is a small size steel cylinder or bottle 71, which has been prefilled with the desired gas under a high pressure. The manufacturing and marketing of such gas-filled cylinders, containing any desired gas and for a wide variety of uses, is an industry in itself.

Such a gas cylinder as 71 is adapted to be replaceably freely received into an open-sided hood-shaped metal holder 72, by which it may be clamped in place in use. The construction and manner of use of such cylinders and holders are well known. The neck of such a gas-containing cylinder is closed by a perforable disc which is adapted to be punctured.

The gas cylinder 71 and its holder 72 are partially shown in broken-line outline in Figures 1 and 5, with the cylinder-containing holder screwed over the outwardly projecting end portion of the nipple 52. The holder 72 draws the bottle 71 inward, seating it on the sealing annulus 69, causing the pin 62 to puncture its closure, the mouth end of the bottle neck then forcing the valve-stem head 61 inward, which unseats the valve head 55.

The little cylindrical bottle 71 contains gas under a pressure around 920 to 940 pounds and is capable of causing a pressure of about 110 pounds within the closed container 10—11, with the latter previously containing a normal quantity of the material to be acted upon. The gas used is of a nature to be absorbed, under pressure, by the material in the container chamber.

The widely distributed gas-discharge apertures 47, 47, and 48, 48, spread throughout the bottom of the jar 10, will produce a substantially homogeneously charged body of the contained material, which is thus maintained in a hermetically sealed condition under pressure until desired for use.

When the gas bottle 71 has exhausted itself, that is, when the pressure of its contained gas has become equalized with that within the container 10—11, this used bottle is to be removed, by removing its holder 72. The outer end of the nipple 52 is then to be covered by a captive dust cap 73, shown in Figure 2.

Protection is provided to guard against the development of a dangerously high pressure within the container 10—11, such as could result from the inadvertent replacement of a used gas cylinder 71 by an unused one.

One side of the dispensing head 14 has an opening 74 through it from its valve-head chamber 17. This is closed by a rupturable removable diaphragm 75, which may be of fiber, forced against an annular sealing gasket 76 by an external clamp ring 77 screwed into the opening 74 and having a diametrical guard bar 78. This diaphragm 75 forms a bursting-disc which will be broken by an unsafe pressure.

As another measure of safety, gas under pressure in the container 10—11 should be vented therefrom before opening it. For this purpose a manually controlled pressure release valve 79 is carried by the container cover 11. The construction of the internal operating parts of this valve 79 is identical with that of the usual and extensively well known automobile tire valve. This valve may be opened in the usual way when its dust cap 80 has been removed.

The gas-charged material is maintained under gas pressure until such time as it is desired for use, either all of it or in any smaller desired amounts from time to time. When the described service valve is opened the gas-charged material will be delivered through the described service duct or dispensing conduit, by reason of the expansion of the gas under pressure contained within such material and by the gas under pressure in the free space above such material.

The outgoing moving stream of such material is subjected to fine subdivision at a plurality of spaced points along the course of its flow through the dispensing conduit, as this stream passes successively through the fine mesh of the described screens. This repeatedly breaks up the larger of the expanding bubbles of contained gas into a larger number of smaller bubbles. The delivered product is thus in an expanded aerated form of fine texture.

Different kinds of gas can be utilized in carrying out my invention, depending upon special requirements in different instances. In most instances nitrous oxide gas ($N_2O$) is suitable. In some cases carbon dioxide gas ($CO_2$) can be used. Atmospheric air is commonly unusable, since it will not be absorbed by the materials which are desired to be charged. A requisite is that any taste imparted by the aerating gas must not be unpleasantly noticeable in the product.

In so far as not already described, the operation and manner of use of the described device are as follows:—

The device of my invention is adapted for use in stores, bakeries, homes, and in fact at any place where products adapted to be produced thereby are desired.

An extensive and important field of utility of my invention is in making whipped cream. For this purpose, nitrous oxide gas is used. Carbon dioxide gas gives an undesired taste to whipped cream. Large quantities of whipped cream are used at soda fountains A helping of whipped cream can always be served while sweet and freshly whipped, since it is automatically whipped while it is being drawn to be served.

Commonly heretofore in whipping cream, by using a hand or an electric whipper, heavy cream, having a high butter-fat content, has to be used in order to prevent the whipped cream from liquefying too rapidly, even though the high butter-fat content gives a buttery taste to the whipped cream.

With the device of my invention, medium cream, having a lower butter-fat content, can be used to advantage. The whipped cream thus produced will have a good body of firm, close texture, while the sweet cream flavor will be preserved. Also, the yield in volume of such whipped cream will be about twice that of the usual whipped cream. Furthermore, none of the usual fillers are needed. Thus it will be evident that there are economies, both in the saving of labor and the expense of materials, with a superior product resulting.

This whipped cream product will be similar, regardless of the butter-fat content. Ordinarily milk can be used if desired.

In the case of batters of all kinds, or of similarly agglutinous materials, they will be expanded into a firm, fine-textured mass.

The device is inexpensive, unlikely to get broken or out of order, requires no servicing other than occasional gasket replacements, and can be readily disassembled for cleaning, which ordinarily will be about once a week.

The larger parts of the device may be castings of aluminum, or a suitable alloy thereof, while the tubing may be Monel metal, or aluminum.

The normal material-containing capacity of the illustrated device is one quart, and its size is dependent upon the amount of liquid to be treated.

It is believed that the usefulness of my invention is now evident.

It is obvious that various modifications may be made in the disclosed process and in the construction shown in the drawings and above particularly described, within the principle and scope of my invention as defined in the appended claims.

I do not specifically limit myself as to materials, size, shape, particular arrangement, or inconsequential details, these being given simply as a means for clearly describing the process and device of my invention.

What I claim is:—

1. In a device adapted for an aerated expanded food product, in combination, a hermetically closable upright container forming a chamber adapted to contain a flowable food material permeated with a gas under pressure and with an extra supply of said gas under pressure within said chamber, a conduit adapted for dispensing said material from said chamber, a normally closed manual valve in control of said conduit, said conduit comprising a vertical tube within said chamber and a laterally extended tube at the outside of said chamber at the top thereof, said vertical tube being open below the normal level of said liquid, said vertical tube being formed of jointed sections having opposed ends, a sieve interposed between the opposed ends of said sections and extending across said tube, the opposed ends of said sections being externally screw-threaded, and an internally screw-threaded coupling for said sections adapted to draw their opposed ends together upon said sieve.

2. In a device adapted for an aerated expanded food product, in combination, a hermetically closable upright container forming a chamber adapted to contain a flowable food material permeated with a gas under pressure and with an extra supply of said gas under pressure within said chamber, a conduit adapted for dispensing said material from said chamber, a normally closed manual valve in control of said conduit, said conduit comprising a vertical tube within said chamber and a laterally extended tube at the outside of said chamber at the top thereof, said vertical tube being open below the normal level of said liquid, said vertical tube being formed of a plurality of more than two successively joined sections having their ends opposed to each other, a sieve interposed between the opposed ends of said sections at each said joint and extending across said tube, and coupling means for said sections at each said joint adapted to draw their opposed ends together upon said sieve.

3. In a device adapted for an aerated expanded food product, in combination, a hermetically closable upright container forming a chamber adapted to contain a flowable food material permeated with a gas under pressure and with an extra supply of said gas under pressure within said chamber, a conduit adapted for dispensing said material from said chamber, a normally closed manual valve in control of said conduit, said conduit comprising a vertical tube within said chamber and a laterally extended tube at the outside of said chamber at the top thereof, said vertical tube being open below the normal level of said liquid, said vertical tube being formed of joined sections having opposed ends, a sieve interposed between the opposed ends of said sections and extending across said tube, coupling means adapted to join said sections and to clamp said sieve between the opposed ends of the latter, and a sieve carried by and extending across said laterally extended tube.

4. In a device adapted for an aerated expanded food product, in combination, a hermetically closable upright container forming a chamber adapted to contain a flowable food material permeated with a gas under pressure and with an extra supply of said gas under pressure within said chamber, a conduit adapted for dispensing said material from said chamber, a normally closed manual valve in control of said conduit, said conduit comprising a vertical tube within said chamber and a laterally extended tube at the outside of said chamber at the top thereof, said vertical tube being open below the normal level of said liquid, said vertical tube being formed of a plurality of more than two successively joined sections having their ends opposed to each other, a sieve interposed between the opposed ends of said sections at each said joint and extending across said tube, coupling means for said sections at each said joint adapted to draw their opposed ends together upon said sieve, said laterally extended tube terminating outwardly in an internally enlarged discharge end, and a sieve carried by and extending across said discharge end.

5. In a device adapted for producing an aerated expanded food product in combination, a container for a gas under pressure and for a flavorable food material charged therewith, means adapted to admit gas under material-charging pressure into said container at a multiplicity of points normally submerged in the contained material, a dispensing conduit leading from within such material to the outside of said container, a service valve in control of said conduit, and means within said conduit adapted for finely subdividing the gas-charged material as the latter flows under gas pressure through said conduit.

6. In a device adapted for producing an aerated expanded food product, in combination, a container comprising a jar and a cover therefor adapted to be detachably secured thereon, a hollow gas-receiving nozzle member removably disposed within said jar just above its bottom, said member being provided with a large number of small gas-escape apertures, a gas-supply tube connected into said member, a tubular nipple extending between the inside and outside of said container and to which said gas-supply tube is connected, and valve means in control of the flow of gas through said nipple.

7. In a device adapted for producing an aerated expanded food product, in combination, a container comprising a jar and a cover therefor adapted to be detachably secured thereon, a hollow gas-receiving nozzle member removably disposed within said jar just above its bottom, said member being provided with a large number of small gas-escape apertures, a gas-supply tube connected into said member, a tubular nipple extending between the inside and outside of said container and to which said gas-supply tube is connected, an inwardly opening valve within said nipple and adapted to prevent a return flow of gas, and a source of supply of gas under pressure adapted to be detachably connected to said nipple externally of said container.

8. In a device adapted for producing an aerated expanded food product, in combination, a container comprising a jar and a cover therefor adapted to be detachably secured thereon, a hollow gas-receiving nozzle member removably disposed within said jar just above its bottom, said member being provided with a large number of small gas-escape apertures, a gas-supply tube connected into said member, a tubular nipple extending between the inside and outside of said container and to which said gas-supply tube is connected, an inwardly opening valve within said nipple and adapted to prevent a return flow of gas, and a source of supply of gas under pressure adapted to be detachably connected to said nipple externally of said container, said nipple being carried by said cover.

9. In a device adapted for producing an aerated expanded food product, in combination, a container comprising a jar and a cover therefor adapted to be detachably secured thereon, a hollow gas-receiving nozzle member removably disposed within said jar just above its bottom, said member being provided with a large number of small gas-escape apertures, a gas-supply tube connected into said member, a tubular nipple extending between the inside and outside of said container and to which said gas-supply tube is connected, an inwardly opening valve within said nipple and adapted to prevent a return flow of gas, a source of supply of gas under pressure adapted to be detachably connected to said nipple externally of said container, and a manually controlled pressure release valve carried by said cover, said nipple being carried by said cover.

10. In a device adapted for producing an aerated expanded food product, in combination, a container comprising a jar and a cover therefor adapted to be detachably secured thereon, a hollow gas-receiving nozzle member removably disposed within said jar just above its bottom, said member being provided with a large number of small gas-escape apertures, a gas-supply tube connected into said member, a tubular nipple extending between the inside and outside of said container and to which said gas-supply tube is connected, an inwardly opening valve within said nipple and adapted to prevent a return flow of gas, a source of supply of gas under pressure adapted to be detachably connected to said nipple externally of said container, said cover being provided with an opening extending between its inside and outside, and a rupturable replaceable diaphragm normally closing said opening.

11. In a device of the class described, an enclosed container, a vertical tube within said container, a valve attached to said container, the upper end of said tube leading to said valve, and the lower end of said tube leading to a point near the bottom of said container, a casing threadedly engaging said container, a replaceable gas filled cartridge within said casing, means carried by said container to puncture said cartridge, a pipe leading from said casing to the lower portion of the interior of said container, and a set of parallel spaced perforated baffle plates in said vertical tube.

12. In a device adapted for producing an aerated expanded food product, in combination, a container for a gas under pressure and for a flowable food material charged therewith, a dispensing conduit leading from within said container to the outside of said container, a service valve in control of said conduit, and a plurality of spaced fine sieves extending across said conduit, said service valve being interposed between two of said sieves in said conduit.

13. In a device adapted for producing an aerated expanded food product, in combination, a container for a gas under pressure and for a flowable food material charged therewith, a dispensing conduit leading from within said container to the outside of said container, a service valve in control of said conduit, and a series of more than two spaced fine sieves extending across said conduit, said service valve being disposed in said conduit between the last two of said sieves in the direction of flow through said conduit.

MARSHALL C. REINECKE.